United States Patent
Murata

[11] Patent Number: 5,819,897
[45] Date of Patent: Oct. 13, 1998

[54] BRAKING FORCE CONTROL SYSTEM FOR MOTOR VEHICLE FURNISHED WITH STARTING CLUTCH

[75] Inventor: Kiyohito Murata, Susono, Japan

[73] Assignee: Toyota Jidosha Kabushiki Kaisha, Toyota, Japan

[21] Appl. No.: 782,924

[22] Filed: Jan. 13, 1997

[30] Foreign Application Priority Data

Jan. 29, 1996 [JP] Japan .................................. 8-012457

[51] Int. Cl.$^6$ .................................................. B60K 41/24
[52] U.S. Cl. ...................................... 192/13 A; 192/219.1
[58] Field of Search ................................ 192/4 A, 13 R, 192/13 A; 303/89; 137/598

[56] References Cited

U.S. PATENT DOCUMENTS

| | | | |
|---|---|---|---|
| 2,217,141 | 10/1940 | Spenkle | 192/13 A |
| 4,610,338 | 9/1986 | Kubota et al. | 192/13 A |
| 4,681,196 | 7/1987 | Fulmer et al. | 192/13 A X |

FOREIGN PATENT DOCUMENTS

| | | |
|---|---|---|
| 1-244930 | 9/1989 | Japan . |
| 6-24258 | 2/1994 | Japan . |

*Primary Examiner*—Richard M. Lorence
*Attorney, Agent, or Firm*—Oblon, Spivak, McClelland, Maier & Neustadt, P.C.

[57] ABSTRACT

A braking force control system for a motor vehicle furnished with a starting clutch, controlling braking force in accordance with driving force (as shown in FIG. 1). When the driver has released a brake pedal from the ON state thereof, the braking force is held until the driving force afforded to the motor vehicle through the starting clutch has been changed-over from a smaller value to a greater value. Thus, the motor vehicle is prevented from moving back when to start on a slope.

3 Claims, 6 Drawing Sheets

BRAKING FORCE CONTROL SYSTEM FOR MOTOR VEHICLE FURNISHED WITH STARTING CLUTCH

BACKGROUND OF THE INVENTION

1. Field of the Invention

The present invention relates to a braking force control system for a motor vehicle furnished with a starting clutch.

2. Description of the Prior Art

Heretofore, in a motor vehicle furnished with a starting clutch, the starting clutch is held in a semi-engaged state even during a very low vehicle speed in a drive range so as to afford a driving force to the motor vehicle. Thus, the motor vehicle can be smoothly started from standing state.

By way of example, the official gazette of Japanese Patent Application Laid-open No. 244930/1989 discloses a control system wherein the driving force of the motor vehicle is controlled by controlling the engagement state of the starting clutch in accordance with the presence or absence of a braking movement. Concretely, the driving force is made smaller while the brake pedal of the motor vehicle is stepped on by the driver thereof, than while it is released. Accordingly, the control system prevents such drawbacks that the fuel consumption of the motor vehicle worsens due to an unnecessarily great driving force and that the lifetime of the starting clutch shortens due to the same.

The prior-art control system for the starting clutch as stated above, however, has the problem that, in a case where the driver has released the brake pedal in order to start the motor vehicle, the driving force does not immediately rise due to the response delay of the starting clutch. Therefore, in starting the motor vehicle on a slope, the motor vehicle sometimes moves back when the driver has released the brake pedal.

SUMMARY OF THE INVENTION

The present invention has been made to correct the problem of the prior art, and its object is to provide a braking force control system for a motor vehicle furnished with a starting clutch, which can reliably prevent the motor vehicle from moving back at the start thereof on a slope.

As illustrated in FIG. 1, the present invention has achieved the above object by adopting a structure as defined in claim 1.

More specifically, the driving force of starting clutch is controlled so that the driving force of motor vehicle may be held smaller when a brake pedal is stepped on. According to the present invention, when the brake pedal stepped on has been released, it is detected whether or not the state in which the driving force is increased has actually been established with the release of the brake pedal (from the previous state in which the driving force was controlled to the smaller value by the driving force control of the starting clutch). Further, a predetermined braking force is held till the changeover into the state of increased driving force is detected. Therefore, the backward movement of the motor vehicle at the start thereof on a slope can be reliably prevented without worsening heat resistance property of the clutch and responsibility of the start.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein.

DETAILED DESCRIPTION OF THE PREFERRED EMBODIMENTS

Now, examples of the aspects of performance of present invention will be described in detail with reference to the drawings.

Figure 1:
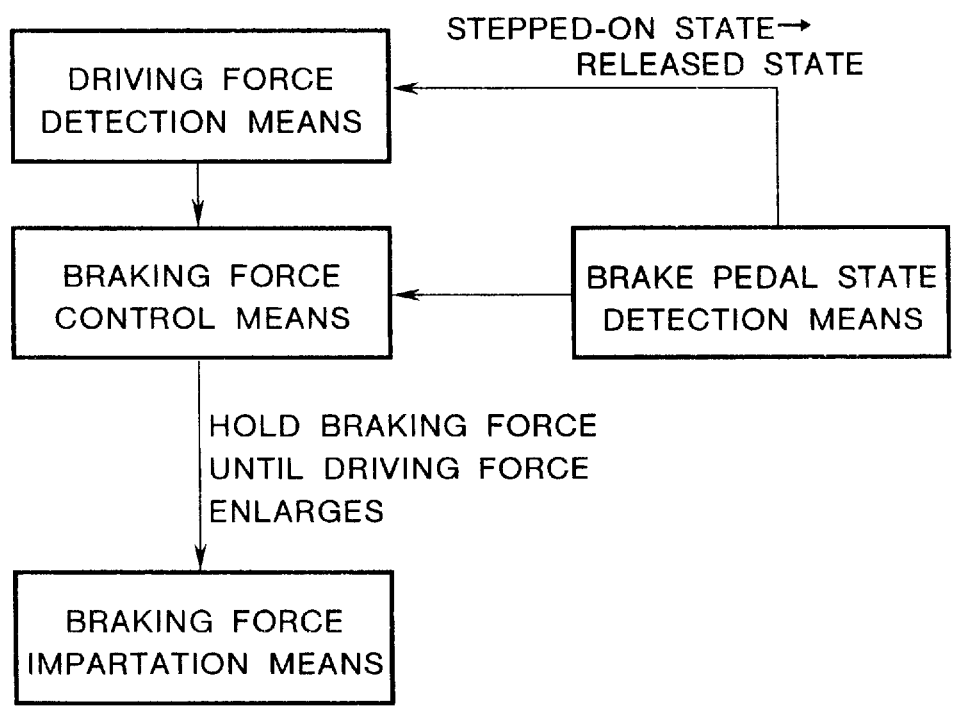
FIG. 1 is a block diagram showing the gist of the present invention.
Figure 2:
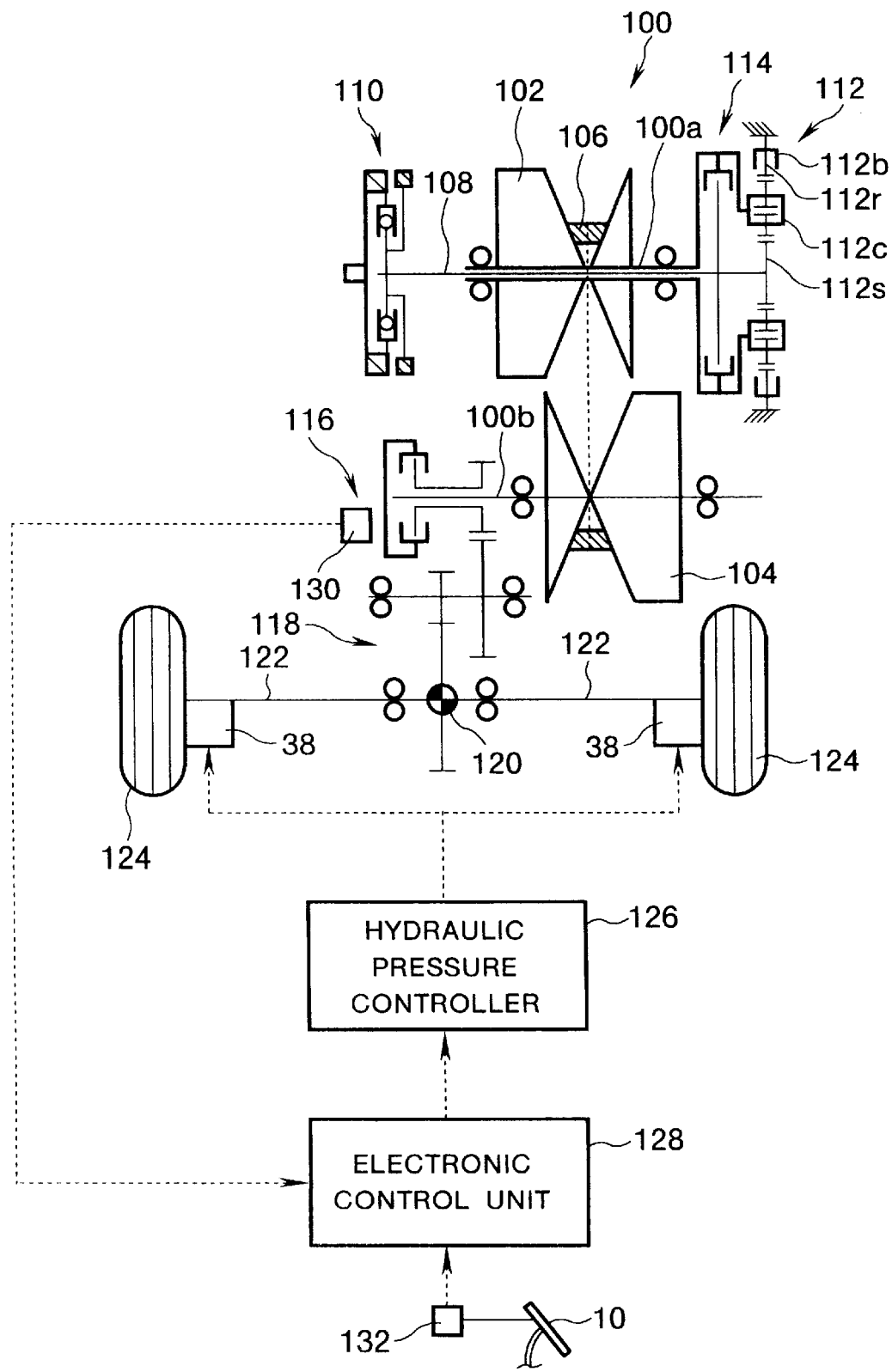
FIG. 2 is a constructional view schematically showing a continuously variable transmission included in a braking force control system for a motor vehicle furnished with a starting clutch according to the present invention.
Figure 3:
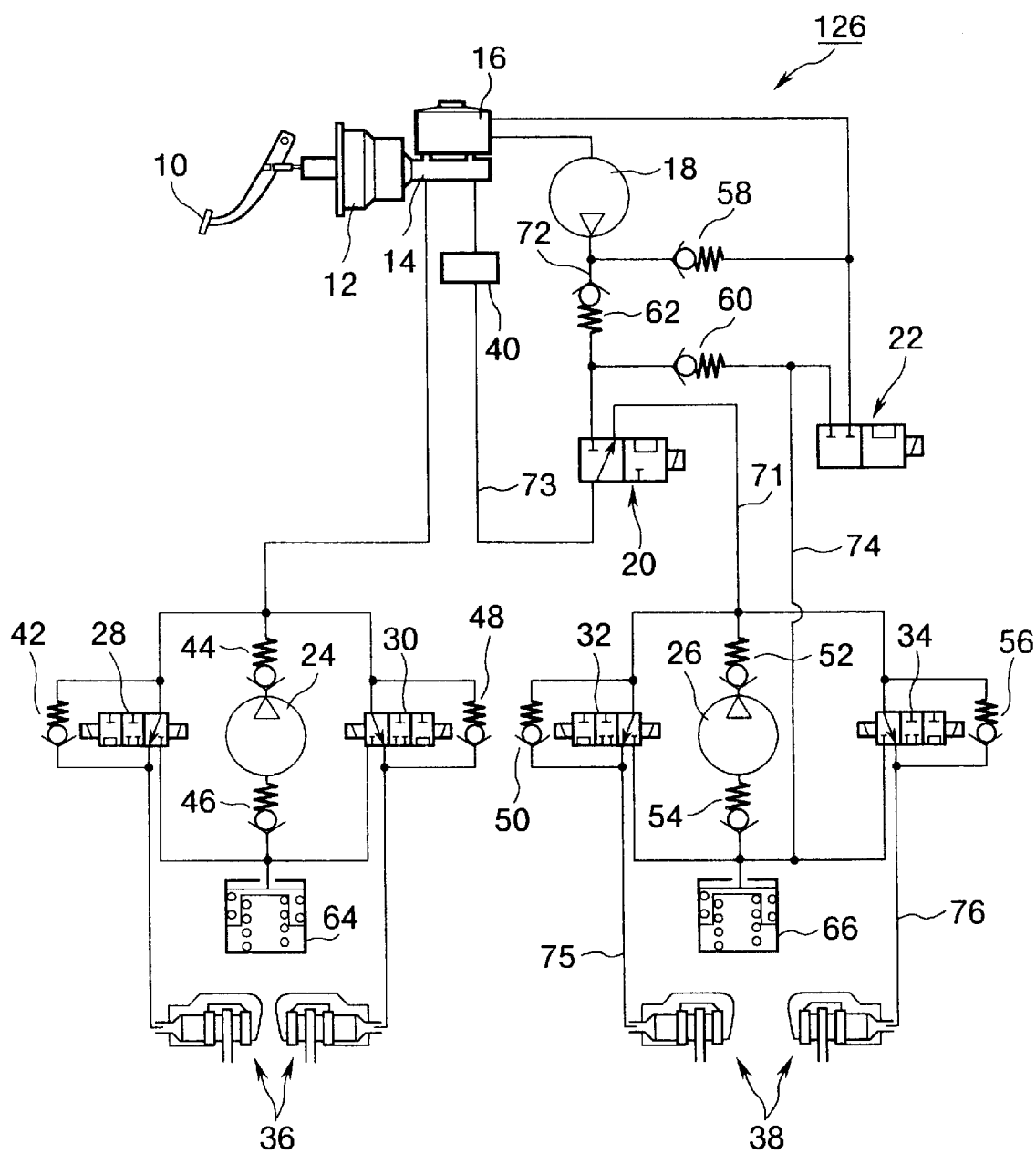
FIG. 3 is a connection diagram showing a hydraulic circuit in the braking force control system for a motor vehicle furnished with a starting clutch according to the present invention.

FIG. 2 illustrates the schematic construction of a continuously variable transmission in a braking force control system for a motor vehicle. The motor vehicle is furnished with a starting clutch according to the present invention. FIG. 3 illustrates a hydraulic circuit for a braking force control.

Referring to FIG. 2, a continuously variable transmission 100 includes a primary pulley 102, a secondary pulley 104, and an endless belt 106 which is V-shaped or trapezoidal in cross section. An input shaft 108 has a flywheel damper 110, and transmits the rotation of an unshown engine to a planetary gear 112 for switching forward/reverse movements. The forward/reverse movement switching planetary gear 112 is so assembled that a sun gear 112s is joined to the input shaft 108, carriers 112c are joined to the input portion 100a of the continuously variable transmission 100 and are also joined to the input shaft 108 through a clutch 114 for the forward movement, and that a ring gear 112r is joined to a brake 112b for the reverse movement.

In addition, the starting clutch 116 is placed at the output portion 100b of the continuously variable transmission 100. Power outputted from the starting clutch 116 is transmitted to front axles 122 through reduction gears 118 as well as differential gears 120. Front tires 124 are respectively joined to the front axles 122. The front tires 124 are respectively provided with front wheel cylinders (braking force impartation means) 38. Herein, brake fluids are supplied to respective front wheel cylinders 38 by a hydraulic pressure controller (braking force control means) 126 which is actuated by an electronic control unit 128, to control the braking hydraulic pressures.

Besides, the starting clutch 116 is provided with a clutch oil pressure sensor (driving force detection means) 130. The signal of the clutch oil pressure sensor 130 and the signal of a brake switch 132 mounted on a brake pedal 10 are inputted into the electronic control unit 128. The electronic control unit 128 controls the operation of the continuously variable transmission 100, the engagement states of the individual clutches, etc.

This aspect of performance consists in that, in order to prevent the backward movement of the motor vehicle at the start thereof on a slope without worsening the heat resistance property of starting clutch 116 and the responsibility of start, a braking force applied before the release of brake pedal 10 is kept unchanged until a driving force becomes sufficiently great owing to increase in the transmission torque capacity of starting clutch 116.

FIG. 3 illustrates the hydraulic pressure controller 126 for controlling braking force mentioned above.

Referring to FIG. 3, numeral 10 designates the brake pedal, numeral 12 a booster, numeral 14 a master cylinder, and numeral 16 a reservoir. Shown at numeral 18 is a pump for a traction control (abbreviated to the "TRC pump"). Numeral 20 indicates a master cylinder cutting-off solenoid valve, while numeral 22 indicates a reservoir cutting-off solenoid valve. Further, numerals 24 and 26 indicate pumps for an antilock brake system (abbreviated to the "ABS pumps"). Also included are three-position solenoid valves 28, 30, 32 and 34. Besides, numeral 36 denotes rear wheel cylinders, and numeral 38 the front wheel cylinders.

Since the motor vehicle is a front-wheel drive vehicle, the braking force according to the present invention is imparted by a part which includes the TRC pump 18 acting on only the front wheels of the motor vehicle. The TRC pump 18 is driven by an unshown motor pump which is actuated in accordance with a command from the electronic control unit 128. This TRC pump 18 is normally held OFF, and when turned ON, it draws the oil from the reservoir 16 and discharges the drawn oil to the side of an oil passage 72 associated with the front wheel cylinders 38.

The master cylinder cutting-off solenoid valve 20 is a valve by which a front-wheel-cylinder oil passage 71 is selectively connected to either the TRC-pump-discharge oil passage 72 or a master-cylinder oil passage 73 where an oil pressure corresponding to a treading force on the brake pedal 10 is generated (that is, the oil passage 71 is switched between the oil passages 72 and 73 by the master cylinder cutting-off solenoid valve 20). The solenoid valve 20 holds the front-wheel-cylinder oil passage 71 and the master-cylinder oil passage 73 in communication at OFF state thereof (as a position shown in FIG. 3), whereas holds the front-wheel-cylinder oil passage 71 and the TRC-pump-discharge oil passage 72 in communication at ON state thereof.

The reservoir cutting-off solenoid valve 22 is a valve which establishes the communication or non-communication between the reservoir 16 and an oil passage 74 associated with the front wheel cylinders 38. More specifically, the solenoid valve 22 does not hold the reservoir 16 and the oil passage 74 in communication (as a position shown in FIG. 3) at OFF state thereof, whereas holds them in communication at ON state therof.

Among the three-position solenoid valves 28, 30, 32 and 34, those 32 and 34 change-over the following three positions: (1) Position at which the braking oil pressure is increased by the communication between an oil passage 75 or 76 on the side of the mated front wheel cylinder 38 and the oil passage 71 on the side of the master cylinder cutting-off solenoid valve 20; (2) Position at which the braking oil pressure is decreased by the communication between the oil passage 75 or 76 on the side of the mated front wheel cylinder 38 and the oil passage 74 on the side of the reservoir cutting-off solenoid valve 22; (3) Position at which the braking oil pressure is held by the non-communication of oil passage 75 or 76, with the oil passage 71 or the oil passage 74.

The basic hardware architecture itself of the hydraulic pressure controller 126 capable of imparting the desired braking forces has already been known. Therefore, the explanation of the controller 126 shall be confined to this extent here. Incidentally, numeral 40 in FIG. 3 denotes a proportioning valve, numerals 42, 44, 46, 48, 50, 52, 54, 56, 58, 60 and 62 denote check valves, and numerals 64 and 66 denote reservoirs.

The operation of the first aspect of performance of the present invention will be explained below with reference to the flow chart of FIG. 4.

Figure 4:
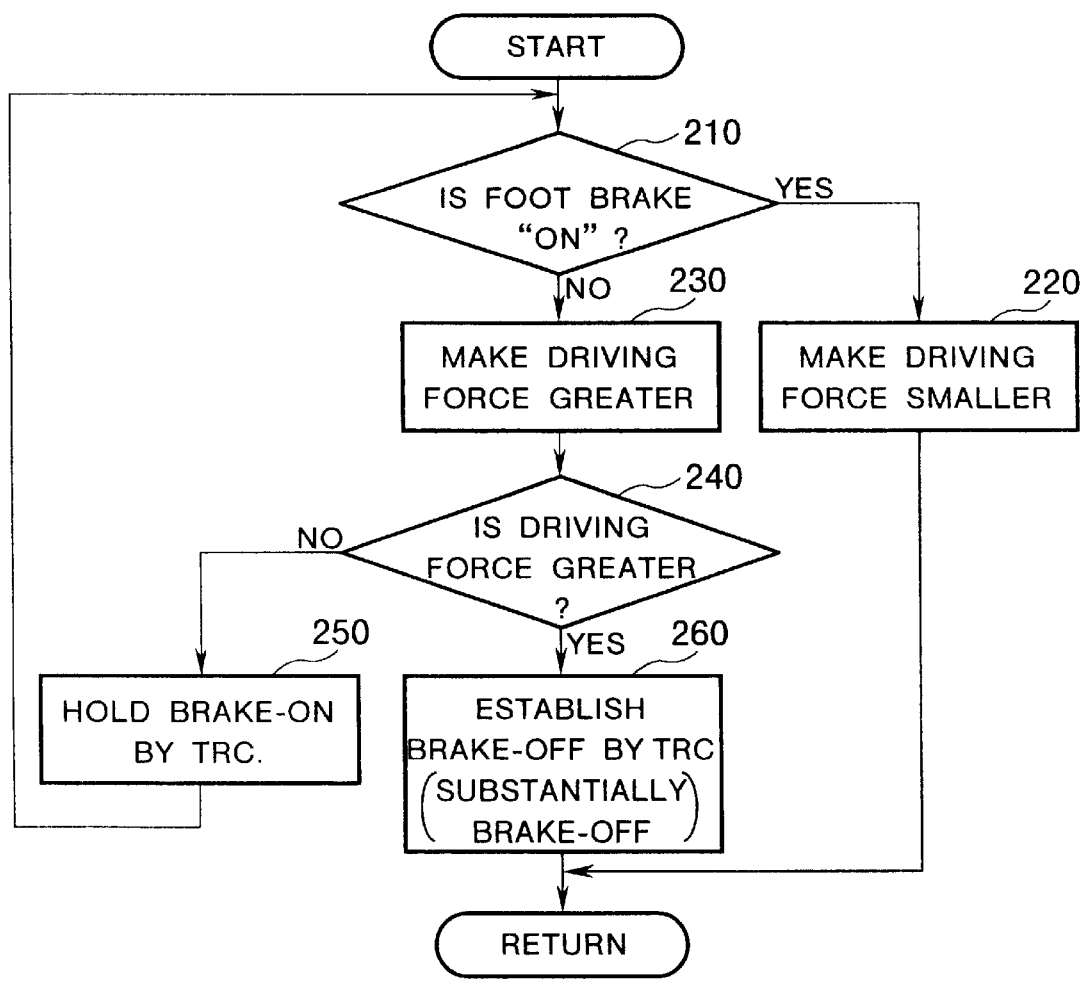
FIG. 4 is a flow chart showing a control in the first aspect of performance of the present invention.

First, at a step 210 in FIG. 4, the electronic control unit 128 decides (or judges) whether or not the motor vehicle is standing because the brake pedal 10 is stepped-on. The turn-ON of foot brake of motor vehicle is detected by the brake switch 132 which is attached to the brake pedal 10.

In a case where the driver of the motor vehicle does not release the brake pedal 10, that is, where the foot. brake is "ON", the control flow proceeds to a step 220 at which the engagement force of starting clutch 116 is controlled so as to make the driving force smaller for preventing the starting clutch 116 from burning due to frictional heat and for enhancing the rate of fuel consumption. Thereafter, the control flow is returned. On the other hand, in a case where the foot brake has turned "OFF", the engagement force of the starting clutch 116 is controlled so as to make the driving force greater at the next step 230.

At a step 240, it is decided whether or not the driving force has become greater (than a predetermined value). The condition of the greater driving force is actually detected in such a way that the engaging oil pressure of the starting clutch 116 is directly measured by the clutch oil pressure sensor 130, and the engaging oil pressure is compared to a predetermined pressure. The predetermined pressure corresponds to a pressure which provides a specified driving force by which the motor vehicle can start even on a slope without moving back. Alternatively, the greater driving force may well be decided by detecting the lapse of a predetermined time period T0 since a command for enlarging the driving force has been issued after the turn-OFF of the foot brake, without mounting the clutch oil pressure sensor 130. It is also allowed to employ any other suitable method.

In a case where the driving force is not greater yet as the result of the decision at the step 240, the braking force applied till then is held by a TRC (traction control) control system, at a step 250. Thereafter, the flow is returned to the step 210, and the loop of the steps 210 thru 250 is iterated.

In the course of the loop, upon detecting at the step 210 that the driver has stepped on the brake pedal 10 again, driving force is made smaller at the step 220. Thus, the usual mode of braking is resumed.

On the other hand, in a case where the driving force has become greater as the result of the decision at the step 240, the braking hydraulic pressure is drained into a substantially brake-OFF state by the TRC system, at a step 260.

The above control will be explained in comparison with the prior-art techniques by reference to FIG. 5 which illustrates the time variations of the driving force and the braking force.

Figure 5:
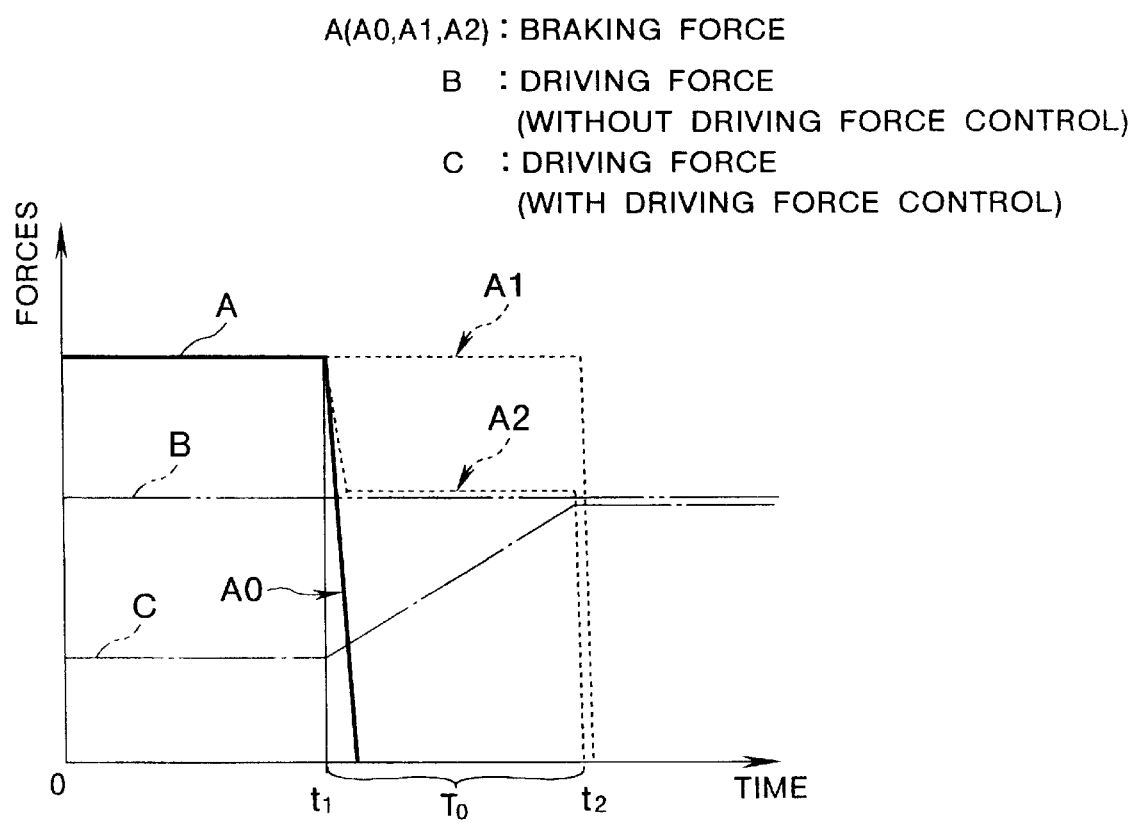
FIG. 5 is a graph showing the time variations of a driving force and a braking force.

In the graph of FIG. 5, the axis of abscissas represents the time, while the axis of ordinates represents the forces such as the clutch engagement force (driving force) and the braking force. A solid line A denotes the braking force. Besides, a two-dot chain line B denotes the driving force in a motor vehicle furnished with a torque converter in the prior art. When the driver of the motor vehicle has released the brake pedal thereof, the braking force changes as indicated by a solid line A0 until the brake OFF state. On this occasion, in a case where the driving force of predetermined value is normally afforded through the torque converter as indicated by the two-dot chain line B, the motor vehicle does not move back even if the brake is turned-OFF at the start of the motor vehicle on a slope. However, since the great driving force is afforded even in the standing state of the motor vehicle with the brake held ON, this technique is problematic in point of fuel consumption. According to the prior-art technique of Japanese Patent Application Laid-open No. 244930/1989, therefore, the driving force is controlled to lower as indicated by a dot-and-dash line C during the turn-ON of the brake by using a starting clutch (for the reason that, a driving force is not necessary and may well be zero while the motor vehicle is standing). However, with this technique, a predetermined time period T0 is required from the point of time t1 at which the brake is turned OFF to give a command for increasing the driving force, to the point of time t2 at which the driving force actually becomes sufficiently great. Accordingly, at the start of the motor vehicle on a steep slope, the driving force does not enlarge immediately when the driver has released the brake pedal thereof so that the motor vehicle sometimes moves back to some extent.

In contrast, according to the aspect of performance of the present invention, even when the driver has turned OFF the brake, actually the braking force is held intact by the TRC system as indicated by a broken line A1. Herein, the brake is substantially turned OFF upon the detection of the fact that the driving force has become sufficiently great. It is therefore permitted to prevent the backward movement of the motor vehicle at the start thereof on a slope.

Next, the second aspect of performance of the present invention will be explained.

Figure 6:
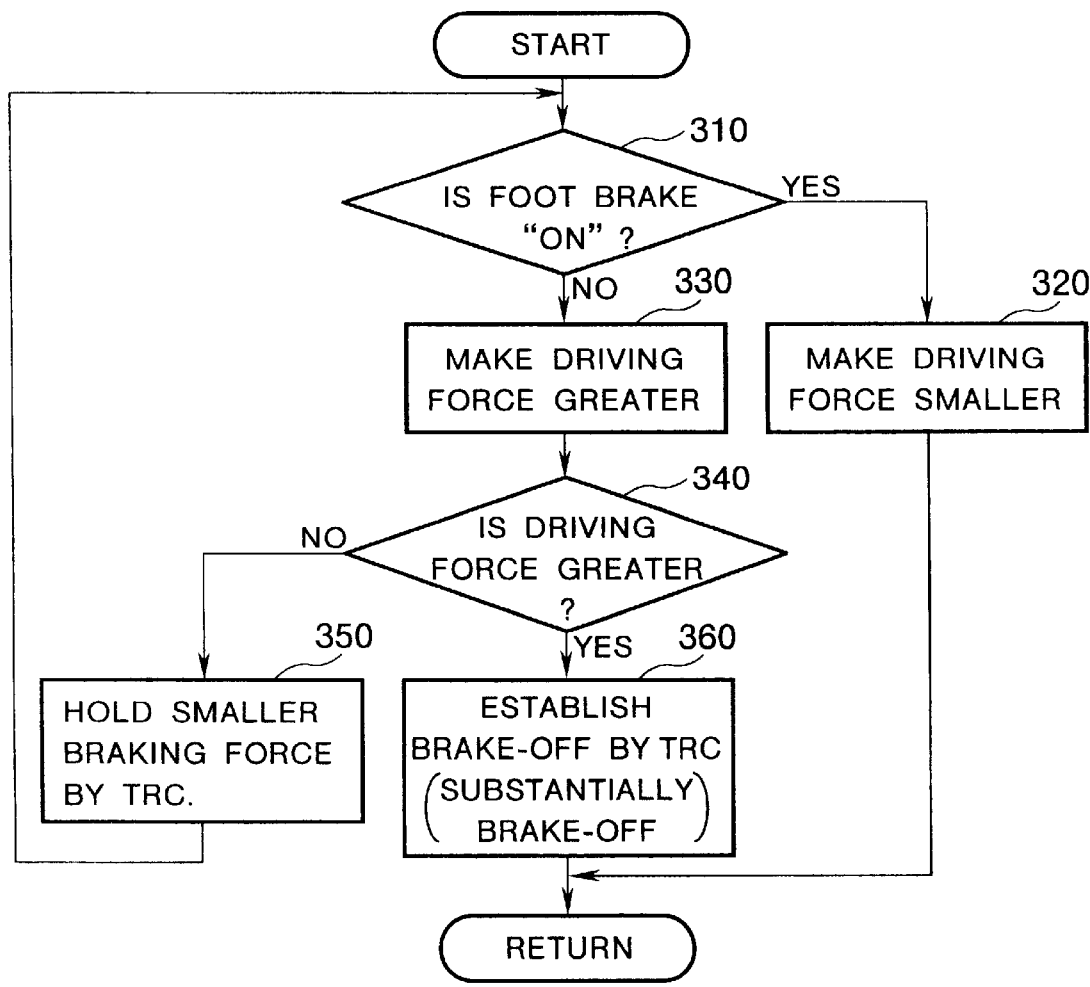
FIG. 6 is a flow chart showing a control in the second aspect of performance of the present invention.

FIG. 6 is a flow chart which illustrates the control of the second aspect of performance. As seen from the flow chart of FIG. 6, the second aspect of performance changes only the step 250 in the flow chart of the first aspect of performance shown in FIG. 4.

More specifically, at the step 250, when the driver has turned OFF the brake, the braking force applied till then is held intact as indicated by the broken line A1 in FIG. 5. On the other hand, at a step 350 in FIG. 6 corresponding to the step 250, the braking force is held at a smaller magnitude for preventing the motor vehicle from moving back, as indicated by a broken line A2 in FIG. 5. Thereafter, when the driving force has become sufficiently great, the brake is substantially turned OFF by the TRC system at a step 360.

Owing to the second aspect of performance, the braking force is appropriately suppressed to the smaller magnitude than in the control of the first aspect of performance. This brings forth the effect that response performance in the case of releasing the braking force betters, for example, on the occasion of the sudden start of the motor vehicle.

By the way, since the processing contents of the other steps in the second aspect of performance are the same as in the first aspect of performance, they shall be omitted from description by affixing step Nos. the two lower digits of which are respectively identical to those of the step Nos. in the flow chart of FIG. 4.

As described above, according to the present invention, a braking force is continued to act on a motor vehicle till the changeover of a driving force to a greater value, so that the motor vehicle can be prevented from moving back at the start thereof on a slope.

What is claimed is:

1. A braking force control system in a motor vehicle furnished with a starting clutch, wherein said starting clutch is held in a semi-engaged state while the motor vehicle lies at very low vehicle speed in a drive range, so as to afford a driving force to the motor vehicle, and wherein an engagement state of the starting clutch is controlled in accordance with a braking movement of a driver of the motor vehicle so as to make the driving force smaller while a brake pedal of the motor vehicle is stepped on, than while it is released; said control system comprising:

braking force impartation means for imparting a braking force to said motor vehicle irrespective of the driver's braking movement;

driving force detection means for detecting that the smaller driving force of the starting clutch has been changed-over to a greater driving force responsive to release of the brake pedal from the stepped-on state thereof; and braking force control means for controlling said braking force impartation means so as to hold the braking force until the changeover to said greater driving force is detected by said driving force detection means.

2. A braking force control system for a motor vehicle furnished with a starting clutch as defined in claim 1, wherein said braking force to be held till the detection of said changeover to said greater driving force has the same magnitude as in said stepped-on state of said brake pedal.

3. A braking force control system for a motor vehicle furnished with a starting clutch as defined in claim 1, wherein said braking force to be held till the detection of said changeover to said greater driving force has a magnitude which is smaller than in said stepped-on state of said brake pedal, but which prevents said motor vehicle from moving back even on a slope.

* * * * *